Patented June 21, 1949

2,473,811

UNITED STATES PATENT OFFICE 2,473,811

DESOXY ISO-XANTHOPTERINS AND PROCESS OF MAKING SAME

John H. Mowat and James H. Boothe, Pearl River, N. Y., assignors, by mesne assignments, to American Cyanamid Company, New York, N. Y., a corporation of Maine No Drawing. Application February 26, 1945, Serial No. 579,882

8 Claims. (Cl. 260—251)

This invention relates to the preparation of new organic compounds. More particularly it relates to 9-desoxy iso-xanthopterin carboxylic acid, its salts, and methods of preparing the same.

We have found that iso-xanthopterin carboxylic acid may be chlorinated and then reduced to produce 9-desoxy iso-xanthopterin carboxylic acid in accordance with the following equations:

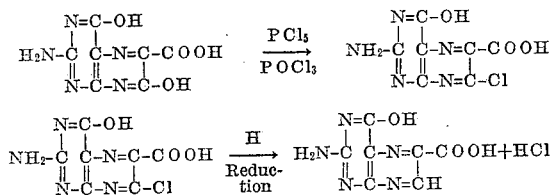

The reaction product may also be designated 2-amino-6-hydroxy-8-carboxy pteridin. It is a light yellow crystalline solid, soluble in dilute alkali and insoluble in dilute acid.

The compounds of the present invention are useful as intermediates in the preparation of other organic compounds. They are also useful because of their blood pressure lowering properties.

In carrying out the present invention iso-xanthopterin carboxylic acid is mixed with one or more halogenating agents such as phosphorus pentachloride, phosphorus oxychloride, phosphorus trichloride, phosphorus tribromide, phosphorus pentabromide, etc. The mixture is heated at a temperature of from about 70° C. to about 120° C. for from about one-half to about three hours. A convenient method is to heat the mixture at reflux temperatures under refluxing conditions. When the reaction is complete the solution is filtered while hot and the filtrate evaporated to dryness in vacuo. The oily residue is then triturated with a small amount of ice water which causes the product to solidify as a yellowish powder. Although it is not usually necessary the product may be further purified by precipitation from cold mild alkali solution, such as sodium carbonate solution, with a mineral acid.

In order to obtain 9-desoxy iso-xanthopterin carboxylic acid from the halogen compound prepared as described above, the latter is treated with a reducing agent such as hydriodic acid or hydrogen produced by the action of an acid on a metal. The mixture is then cooled, diluted with water, and the solid product removed by filtration.

The product may be further purified by dissolving it in an alkali metal hydroxide solution, filtering and allowing the filtrate to stand in an ice box whereupon yellow crystals of the alkali metal salt of 9-desoxy iso-xanthopterin carboxylic acid will separate and can be recovered.

The free acid can be obtained from the metallic salts by dissolving the salt in alkaline solution and acidifying with a mineral acid as shown in the specific examples.

The following specific examples are given by way of illustration and not of limitation and modification may be made without departing from the spirit and scope of the invention.

Example 1

A mixture of 0.591 g. of iso-xanthopterin carboxylic acid (prepared by method of Purrmann, Ann., 548,284, 1941), 3.0 g. of phosphorus pentachloride, and 30 cc. of phosphorus oxychloride was heated on steam bath for 20 minutes and then refluxed for 30 minutes. An additional 15 cc. of phosphorus oxychloride was then added and refluxing was continued for 15 minutes. The solution was filtered while hot and the filtrate was evaporated to dryness in vacuo. The oily residue was then triturated with a small amount of ice water until the oily material solidified. The yellowish product was filtered off and washed with water, ethanol and ether.

A mixture of 1.49 g. of the above product, 21 cc. of glacial acetic acid and 21 cc. of hydriodic acid (sp. gr. 1.7) was heated on a steam bath with stirring for 5 minutes. The reaction mixture was then cooled and diluted with 150 cc. of water. After stirring for about 10 minutes, the mixture was filtered and the solid product was washed with water containing a little sulphur dioxide to remove traces of iodine. After further washing with small amounts of water, alcohol and ether the dried product weighed 0.662 g.

This material was dissolved in about 35 cc. of very dilute sodium hydroxide and Norited several times to remove some red color. The filtered yellow solution was then concentrated to a volume of 10 cc. and treated with sufficient 10 normal sodium hydroxide to make the solution about 4 normal in sodium hydroxide. Crystals began to separate rapidly from this strongly alkaline solution. After standing in the ice box for 48 hours the yellow crystals were collected and washed with 1. normal sodium hydroxide, then with methanolic sodium hydroxide, absolute alcohol and ether. This product was combined with an additional 0.040 g. of material from a previous run, dissolved in very dilute sodium hydroxide solution, filtered and made up to a volume of 7.5 cc. This solution was treated with 0.85 cc. of 10 normal sodium hydroxide solution and allowed to crystallize in the ice box over night. The crystals of the sodium salt of 9-desoxy iso-xanthopterin carboxylic acid were then separated, washed, and dried. The ultra violet absorption curves of this material in both acid and alkali and the X-ray diffraction pattern were identical with the product obtained by alkaline hydrolysis of folic acid.

*Example 2*

A solution of 0.080 g. of the sodium salt of 9-desoxy iso-xanthopterin carboxylic acid in 5 cc. of warm water at pH 12 was prepared and then concentrated hydrochloric acid was added dropwise to pH 1.0. After cooling for two hours the precipitate was collected and washed once with very dilute hydrochloric acid. The solid was then dissolved in dilute sodium hydroxide to pH 12 and again precipitated as above. The precipitate was then washed seven times with 4–5 cc. portions of water acidified to pH 2 with hydrochloric acid, then with methanol and finally with ether. A yield of 0.043 g. of 9-desoxy iso-xanthopterin carboxylic acid was obtained. On standing, the washings slowly deposited an additional 10 to 15 mg. of product. Analysis for carbon, hydrogen and nitrogen showed close agreement with the theoretical values.

In the above example hydrochloric acid is used to convert the sodium salt to the free acid. We can also use other acids such as acetic acid, sulfuric acid, nitric acid, phosphoric acid, and the like.

We claim:

1. New compounds of the group consisting of 9-desoxy iso-xanthopterin carboxylic acid and its alkali metal salts.
2. 9-desoxy iso-xanthopterin carboxylic acid.
3. The sodium salt of 9-desoxy iso-xanthopterin carboxylic acid.
4. The potasium salt of 9-desoxy iso-xanthopterin carboxylic acid.
5. A method of preparing 9-desoxy iso-xanthopterin carboxylic acid which comprises heating iso-xanthopterin carboxylic acid with a chlorinating agent to obtain 9-chloro iso-xanthopterin carboxylic acid and reducing said chloro compound to obtain 9-desoxy iso-xanthopterin carboxylic acid.
6. In a method of preparing 9-desoxy iso-xanthopterin carboxylic acid the step which comprises treating 9-chloro iso-xanthopterin carboxylic acid with hydriodic acid.
7. In a method of preparing 9-desoxy iso-xanthopterin carboxylic acid the step which comprises reducing 9-chloro iso-xanthopterin carboxylic acid to obtain 9-desoxy iso-xanthopterin carboxylic acid.
8. In a method of preparing 9-desoxy iso-xanthopterin carboxylic acid the step which comprises treating 9-chloro iso-xanthopterin carboxylic acid with hydriodic acid in the presence of acetic acid.

JOHN H. MOWAT.
JAMES H. BOOTHE.

REFERENCES CITED

The following references are of record in the file of this patent:

UNITED STATES PATENTS

| Number | Name | Date |
|---|---|---|
| 607,029 | Fischer | July 12, 1898 |

OTHER REFERENCES

Chemical Reviews, October 1933, pages 213 to 222.

Chem. Abstracts, 1943, page 2741, citing: Ann., vol. 548, pages 284–292 (1941).